Patented Nov. 18, 1947

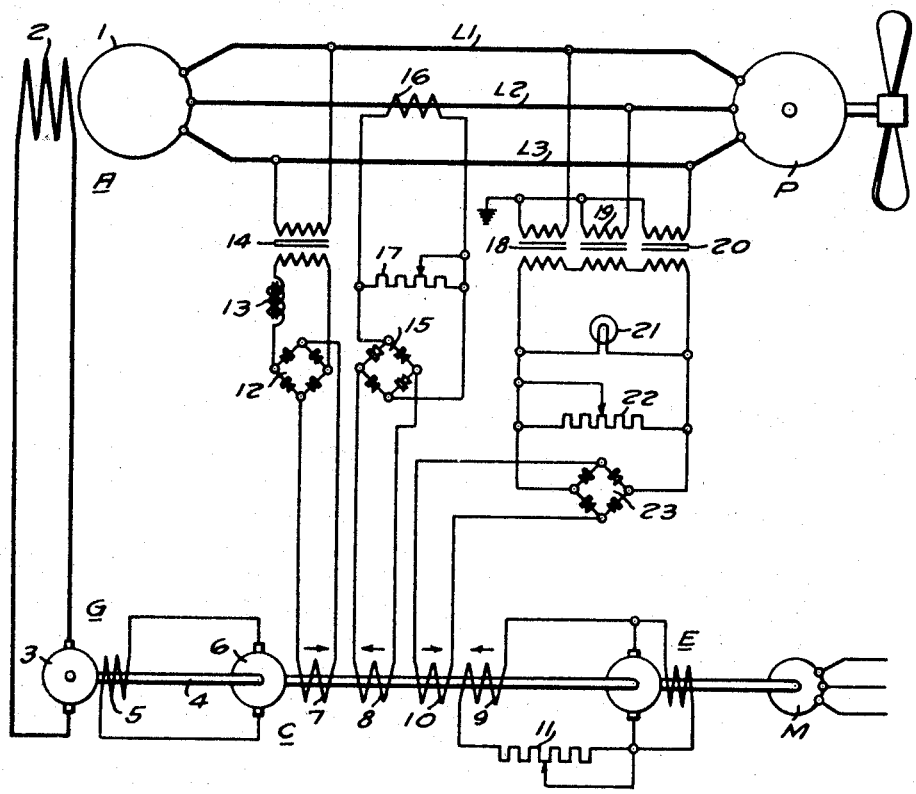

2,431,252

UNITED STATES PATENT OFFICE 2,431,252

ALTERNATING CURRENT DRIVE PROTECTIVE SYSTEM

Earl H. Hornbarger, Edgewood, Pa., assignor to Westinghouse Electric Corporation, East Pittsburgh, Pa., a corporation of Pennsylvania Application November 13, 1945, Serial No. 628,289

8 Claims. (Cl. 172—237)

My invention relates to motor control systems and particularly to variable voltage drives in which the motor is energized by a generator or alternator whose field is excited under control by an auxiliary generator for regulating the energization of the motor in accordance with a desired condition.

For instance, in alternating-current propulsion drives, the propulsion motor is energized by an alternator whose field is controlled by a regulating or control generator so as to maintain a given ratio of motor load current and voltage-per-cycle value, thereby securing a stable operation of the propulsion system regardless of changes in propulsion speed. The motor speed is varied by changing the speed of the prime mover or motor driving the alternator, thereby increasing the frequency of the alternating load voltage imposed on the propulsion motor.

Referring to motor control systems or propulsion drives of the above-mentioned type, it is an object of my invention to provide for an automatic limitation of the load current if the voltage distribution in the load circuit becomes unbalanced in particular due to the occurrence of grounding; and it is especially aimed at achieving such a current limitation without the use of additional circuit breakers or contactors and in such a manner that the protective effect is produced by the action of the same auxiliary generator that controls or regulates the energization of the drive motor under normal operating conditions.

The invention will be understood from the embodiment of an alternating-current propulsion system shown diagrammatically in the drawing.

According to the drawing, a ship propulsion motor P is connected by the phase leads L1, L2 and L3 of a propulsion bus (load circuit) with the armature 1 of an alternating-current generator A. This generator is driven at variable speed from a suitable prime mover or motor (not illustrated) so that the frequency of the load voltage imposed on the propulsion bus can be varied in order to adjust the speed of motor P accordingly. The propulsion motor P consists of a polyphase motor such as a synchronous motor or wound-rotor induction motor. As a rule, several propulsion motors and several alternators are provided and the interconnecting propulsion bus is designed as a branched system and equipped with set-up switches in order to connect any one or several of the motors with any one or several of the alternators. These and other customary details are well known as such, and since they are not an essential feature of the invention proper, they are not illustrated in the drawing.

The amplitude of the load voltage and hence the magnitude of the load current is controlled by a field winding 2 of the alternator A, the circuit of this field winding includes the armature 3 of a generator G. The shaft 4 of armature 3, during the operation of the system, is driven at substantially constant speed by an auxiliary motor M. The direct-current voltage generated in armature 3 is controlled by a field winding 5 which receives its excitation from the armature 6 of a control or regulating generator C. Armature 6 is also mounted on shaft 4 and hence runs normally at constant speed. The control generator C has four field windings denoted by 7, 8, 9 and 10. The field winding 9 serves to provide the generator C with standard or pattern excitation. This excitation is provided by a suitable source of constant direct-current voltage, here represented by an exciter E whose armature is mounted on shaft 4 and hence also driven at constant speed. The standard excitation of winding 9 is adjustable by means of a rheostat 11. The two field windings 7 and 8 are energized and connected so that the polarities of their respective fields are in opposition to each other, that is, these fields are differential and balanceable relative to each other. Field winding 7 is connected to the output terminals of a rectifier unit 12. The primary circuit of unit 12 is connected through a reactor 13 to the secondary winding of a transformer 14 whose primary winding is connected to two of the phase leads of the propulsion bus. Due to this connection, the excitation of field winding 7 depends upon the voltage generated by the alternator A. However, the reactance value of reactor 13 is so large that the degree of excitation is essentially proportional to the volts-per-cycle value of the generated power throughout the available speed or frequency range.

Field winding 8 is connected to the output terminals of a rectifier unit 15 whose input energy is derived from a current transformer 16 associated with one of the phase leads of the propulsion bus. The excitation of the field winding 8 is, therefore, proportional to the load current of motor P. and this excitation can be calibrated by means of a rheostat 17 so that the differentially acting field windings 7 and 8 balance out when the volts-per-cycle value has the correct proportion to the magnitude of the load current.

Three transformers 18, 19 and 20 have one terminal of their primary windings connected across to the three phase loads respectively, while the other terminals are interconnected to form a Y or star connection, the star point being grounded. The appertaining three secondary windings are arranged in series relation to one another. An indicating device, here shown as a lamp 21, is connected across the terminals of the secondary series connection. Attached to these terminals are further a rheostat 22 and a rectifier unit 23 whose output terminals are connected to the field winding 10. As long as the propulsion bus is energized by a balanced three-phase voltage, the secondary voltages of the transformers 18, 19 and 20 cancel one another so that the resultant output voltage is substantially zero. Hence the device 21 indicates zero and the control field winding 10 is not energized under normal operating conditions of the system. Should a ground occur in one phase of the propulsion bus, the primary of one of the transformers 18, 19 and 20 becomes short circuited so that its secondary voltage is zero. The vector sum of the voltages in the two other secondary windings is now $\sqrt{3}$ times the voltage of one winding. This resultant voltage appears across the secondary series arrangement. It will cause the lamp 21 to light, thereby indicating that a ground exists somewhere in the propulsion system. At the same time, a rectified voltage is impressed on the field winding 10. The polarity of this voltage is such that the field of winding 10 is in opposition to the standard or pattern field of winding 9. Hence the effect of winding 9 is to reduce the resultant excitation of control generator C and hence the field excitation of generator G, so that the field winding 2 of the alternator A receives also reduced excitation and decreases the load current in the propulsion bus. As a result, the ground current is reduced to a neglible or safe value.

It will be understood from the foregoing that when the system is operating under steady state conditions the field excitation of the control generator C is determined substantially only by the standard or pattern field winding 9 as adjusted by means of the rheostat 11. The field winding 10 is normally not excited and the resultant field of the differentially acting field windings 7 and 8 is substantially zero. Any change in the operating conditions resulting in instability will cause one or the other of field windings 7 or 8 to become predominantly excited as compared with the other differential field winding. Hence the excitation of generator C and, consequently, the field excitation of the alternator A are automatically varied in the direction and to the extent necessary to restore stable conditions.

While I have illustrated my invention in conjunction with a ship propulsion system, it will be understood by those skilled in the art that the invention is similarly applicable to variable voltage control systems for other purposes and may be modified to suit the particular requirements or desiderata. For instance, instead of using a control generator C and another generator G in cascade connection as shown in the drawing, the controlling generator C may be directly connected with the field circuit of the main generator or alternator to be regulated, especially when the control system does not require the high degree of amplification inherent in the illustrated cascade connection. It will further be obvious that while I have shown the field of the main generator or alternator to receive its full excitation under control by the control generator, it is also possible and within my invention to excite the main field from a substantially constant voltage source and to connect the control generator in the field circuit so that it boosts or bucks the constant excitation in order to obtain the desired control effect. In view of the possibility of modifying systems according to the invention in various ways, it will be understood that variations and changes other than those specifically referred to above can be made without departing from the essence of my invention and within the scope of its essential features as set forth in the claims attached hereto.

I claim as my invention:

1. A motor control system, comprising a polyphase motor, a polyphase load circuit for energizing said motor, a polyphase generator connected to said load circuit to provide variable voltage for said motor and having a field circuit for controlling said voltage, control means connected with said field circuit for providing variable excitation therefor and including a control generator having field means for controlling said excitation, unbalance-responsive circuit means connected across said polyphase load circuit to provide a control voltage depending upon unbalance of the voltage distribution of said load circuit, and means connecting said circuit means to said field means to impose said control voltage on said field means so as to cause said control generator to effect a reduction of said excitation in response to said unbalance.

2. A motor control system, comprising a polyphase alternator, a polyphase load circuit connected thereto, a polyphase motor connected to said load circuit to be energized by variable voltage generated by said alternator, said alternator having a field circuit for controlling said voltage, control means connected with said field circuit for providing variable excitation therefor and including a control generator having field means for controlling said excitation, a plurality of transformers having respective primary windings connected in star arrangement to a plurality of phases of said load circuit respectively and having a grounded star point, said transformers having respective secondary windings interconnected in series opposition so as to provide a secondary voltage which increases in response to occurrence of grounding in said load circuit, said secondary windings being connected to said field means so as to cause said control generator to effect a reduction of said excitation in response to the occurrence of grounding in said load circuit in order to then limit the voltage generated by said alternator.

3. A motor control system, comprising a three-phase alternator, a three-phase load circuit connected thereto, a three-phase motor connected to said voltage generated by said alternator, said alternator having a field circuit for controlling said voltage, control means connected with said field circuit for providing variable excitation therefor and including a control generator having field means for controlling said excitation, three transformers with primary windings star-connected across the three phases respectively of said load circuit and having a grounded star point, said transformers having respective secondary windings series-connected with one another so as to provide substantially zero voltage in normal condition of said load circuit and a finite voltage when said load circuit becomes grounded, and rectifying means connecting said secondary windings with said field means so as to cause said control generator to effect a reduction of said excitation in response to the occurrence of grounding in order to thereby limit the ground current.

4. A polyphase alternating-current drive, comprising an alternator for providing variable load voltage having a field circuit for controlling said voltage, a polyphase load circuit connected to said alternator, a motor connected to said load circuit to be energized by said voltage, direct-current control means connected with said field circuit for providing variable excitation therefor and including a direct-current generator having field means for controlling said excitation, direct-current means connected with said field means for exciting them in accordance with a normally desired performance of said alternator, and a plurality of transformers having primary windings connected across different respective phases of said load circuit and secondary winding series connected with one another so as to impose a variation on their resultant output voltage in response to the occurrence of unbalanced voltage distribution in said load circuit, and rectifying means connected between said secondary windings and said field means so as to control said direct-current generator to cause said alternator to reduce said load voltage in response to said variation in transformer output voltage.

5. A polyphase alternating-current drive, comprising an alternator for providing variable load voltage having a field circuit for controlling said voltage, a polyphase load circuit connected to said alternator, a motor connected to said load circuit to be energized by said voltage, direct-current control means connected with said field circuit for providing variable excitation therefor and including a direct-current control generator having three field windings for jointly controlling said excitation of which two are differential and balanceable relative to each other, current-responsive energizing means connected between one of said balanceable field windings and said load circuit for energizing said one field winding in dependence upon load current in said load circuit, energizing means attached to said load circuit to be responsive to the volts-per-cycle value of said load current and being connected to said other balanceable field winding for energizing it in dependence upon said valve, and a plurality of transformers with primary windings connected to different respective phases of said load circuit and having a common grounded terminal point, said transformers having respective secondary windings series-connected with one another and connected to said third field winding for varying its energization in response to the occurrence of grounding in said load circuit so as to then cause said control generators to reduce said excitation of said alternator.

6. A polyphase alternating-current drive, comprising an alternator for providing variable load voltage having a field circuit for controlling said voltage, a polyphase load circuit connected to said alternator, a motor connected to said load circuit to be energized by said voltage, direct-current control means connected with said field circuit for providing variable excitation therefor and including a direct-current control generator having four field windings for jointly controlling said excitation of which two are differential and balanceable relative to each other, current responsive means connected with said load circuit, rectifying means connecting said current transformer with one of said balanceable field windings for energizing the latter in dependence upon the load current in said load circuit, a voltage transformer connected with said load circuit and having a secondary circuit provided with a reactor and rectifying means, said other balanceable field winding being connected to said latter rectifying means to be energized in dependence upon the volts-per-cycle value of said load current, circuit means connected with one of said remaining two field windings to provide standard excitation for said control generator, and phase-balance responsive means connected with said load circuit for energizing the fourth field winding in opposition to said standard excitation upon occurrence of phase-unbalance in said load circuit in order to then reduce the excitation of said alternator field means.

7. A polyphase alternating-current drive, comprising an alternator for providing variable load voltage having a field circuit for controlling said voltage, a polyphase load circuit connected to said alternator, a motor connected to said load circuit to be energized by said voltage, direct-current control means connected with said field circuit for providing variable excitation therefor and including a direct-current control generator having four field windings for jointly controlling said excitation of which two are differential and balanceable relative to each other, current responsive means connected with said load circuit, rectifying means connecting said current transformer with one of said balanceable field windings for energizing the latter in dependence upon the load current in said load circuit, a voltage transformer connected with said load circuit and having a secondary circuit provided with a reactor and rectifying means, said other balanceable field winding being connected to said latter rectifying means to be energized in dependence upon the volts-per-cycle value of said load current, circuit means connected with one of said remaining two field windings to provide standard excitation for said control generator, a plurality of transformers having grounded primary windings connected across different respective phases of said load circuit and secondary winding series connected with one another and connected to the fourth field winding for energizing it in dependence upon the occurrence of grounding in said load circuit so as to then buck said standard excitation in order to cause said control generator to reduce the excitation of said alternator field means.

8. An alternating-current propulsion system, comprising a three-phase alternator having a direct-current field winding for providing variable load voltage, a propulsion motor, a polyphase propulsion bus connecting said motor with said alternator, a field circuit connected to said winding to provide variable excitation therefor and including a control generator having a plurality of control field windings for controlling said excitation, circuit means connected with one of said control field windings for providing standard excitation for said control generator, stability regulating means connecting other control field windings respectively with said propulsion bus, and phase-balance responsive control means connected with said bus for energizing another one of said control field windings in opposition to said standard excitation upon occurrence of phase unbalance in said bus in order to then reduce the excitation of said alternator field winding.

EARL H. HORNBARGER.